(12) United States Patent
Yoshida

(10) Patent No.: US 7,722,973 B2
(45) Date of Patent: May 25, 2010

(54) FUEL CELL

(75) Inventor: Yuichi Yoshida, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 319 days.

(21) Appl. No.: 11/908,609

(22) PCT Filed: Mar. 20, 2006

(86) PCT No.: PCT/JP2006/305532

§ 371 (c)(1), (2), (4) Date: Sep. 14, 2007

(87) PCT Pub. No.: WO2006/101071

PCT Pub. Date: Sep. 28, 2006

(65) Prior Publication Data

US 2009/0011304 A1 Jan. 8, 2009

(30) Foreign Application Priority Data

Mar. 24, 2005 (JP) ............................. 2005-086508

(51) Int. Cl.
  *H01M 8/02* (2006.01)
  *H01M 8/04* (2006.01)
  *H01M 8/10* (2006.01)
(52) U.S. Cl. ........................................ 429/26; 429/30
(58) Field of Classification Search .................. 429/26, 429/27, 30
   See application file for complete search history.

(56) References Cited

U.S. PATENT DOCUMENTS 5,470,671 A * 11/1995 Fletcher et al. ............... 429/26

2003/0198853 A1 * 10/2003 Choi et al. .................... 429/32
2004/0258970 A1 12/2004 McLean

FOREIGN PATENT DOCUMENTS

| EP | 0 406 831 A1 | 1/1991 |
|---|---|---|
| EP | 0 833 400 A1 | 4/1998 |
| JP | 160722 | 12/1978 |
| JP | 61 55870 | 3/1986 |
| JP | 2000 106201 | 4/2000 |
| JP | 2000-268836 | 9/2000 |
| JP | 2003 86207 | 3/2003 |
| JP | 2004 55307 | 2/2004 |
| JP | 2004 71263 | 3/2004 |
| JP | 2004 127833 | 4/2004 |

* cited by examiner

*Primary Examiner*—Gregg Cantelmo
(74) *Attorney, Agent, or Firm*—Oblon, Spivak, McClelland, Maier & Neustadt, L.L.P.

(57) ABSTRACT

A membrane electrode assembly is constituted of a solid electrolyte membrane 1 made of a polymeric material, and a fuel electrode 2 and an air electrode 3 which are disposed on both sides of the solid electrolyte membrane 1. A porous membrane 8 is attached to the back surface of the fuel electrode 2, and a fuel tank 12 is formed between a casing 16 of the fuel electrode 2 side and the porous membrane 8. The fuel tank 12 is filled with liquid-retaining sheets 14. An air chamber 13 is formed on the back surface of the air electrode 3, and the air chamber 13 is filled with moisture-retaining sheets 15. A casing 17 of the air electrode 3 side is provided with a number of inlet ports 21. Further, fins 22 are formed on an outer surface of the casing 17 of the air electrode side.

8 Claims, 8 Drawing Sheets

FUEL CELL

TECHNICAL FIELD

The present invention relates to a fuel cell in which hydrogen ions separated from a liquid fuel by using a catalyst at the fuel electrode are used to generate electricity and, more particularly, to a fuel cell in which an active transfer means such as a pump is not used to supply the liquid fuel to the fuel electrode.

BACKGROUND ART

In recent years, with the object of enabling various portable electronic apparatuses such as a notebook computer and a cellular phone to be used for a long time without charging, attempts to use fuel cells as power sources of these portable apparatuses are made at various places. The fuel cell has a feature that electricity is generated by supplying only a fuel and air, and when only the fuel is resupplied, electricity can be continuously generated for a long time. Accordingly, if downsizing is realized, the fuel cell can be regarded as a system which is very profitable as a power source of a portable apparatus.

Particularly, in a direct methanol fuel cell (DMFC), methanol having high energy density is used as the fuel, and an electric current is directly derived from methanol by using a catalyst layer and a solid electrolyte membrane, and thus any reforming device is not required, downsizing is enabled, and the fuel can be handled easier than the hydrogen gas. Accordingly, the direct methanol fuel cell is promising as a power source of a small-sized portable apparatus.

As the supply systems of the fuel of the DMFC, known are a gas-supply-type DMFC in which a liquid fuel is vaporized and supplied to the inside of the fuel cell by a blower or the like, a liquid-supply-type DMFC in which a liquid fuel is directly supplied as it is to the inside of the fuel cell by a pump or the like, and an internal-vaporization-type DMFC in which a liquid fuel supplied to the fuel cell is vaporized inside the fuel cell and supplied to the fuel electrode.

As described in, for example, Jpn. Pat. Appln. KOKAI Publication No. 2000-106201, the internal-vaporization-type DMFC is provided with a fuel permeation layer for retaining the liquid fuel and a fuel vaporization layer for diffusing a vaporizable component of the liquid fuel retained in the fuel permeation layer, and in which the vaporized liquid fuel is supplied from the fuel vaporization layer to the fuel electrode. In the document described above, an aqueous solution of methanol obtained by mixing methanol and water at a molar ratio of 1:1 is used as the liquid fuel, both the methanol and water are supplied to the fuel electrode in a gaseous state. There has been a problem with such a fuel cell using an aqueous solution of methanol as the fuel that it is difficult to obtain a sufficient output characteristic because of a difference between methanol and water in the vaporization rate. Therefore, in order to improve the output characteristic of the fuel cell and further downsize the fuel cell, development of fuel cells using pure methanol as the fuel are now being advanced.

Further, as a small fuel cell mainly used in a mobile apparatus, a passive-type fuel cell in which an active transfer means such as a fuel pump is not used to supply a liquid fuel to a fuel electrode is also being developed. When a fuel cell is used in a mobile apparatus, it is difficult to employ a forced air-cooling means such as a fan, and thus heat generated by the bonding of hydrogen and oxygen must be discharged to the outside of the fuel cell by natural air cooling. If discharge of heat is insufficient and the temperature of the fuel cell becomes excessively high, electricity generation efficiency is lowered because of an increase in so-called crossover in which a liquid fuel such as methanol or the like passes from the fuel electrode to the air electrode, and further, the performance of the mobile apparatus main body is adversely affected or the portability of the mobile apparatus is impaired.

DISCLOSURE OF INVENTION

The present invention has been contrived in consideration of the problems of a fuel cell in which an active transfer means such as a pump is not used to supply a liquid fuel to a fuel electrode as described above. An object of the present invention is, in a fuel cell, to suppress a temperature rise of the fuel cell by increasing heat discharging capability, thereby improving the output characteristic and increasing the fuel cell life.

A fuel cell according to the present invention comprises:

a solid electrolyte membrane having ion conductivity;

a fuel electrode disposed on one side of the solid electrolyte membrane and having an anode catalyst layer to which a fuel component of a liquid fuel is supplied;

an air electrode disposed on the other side of the solid electrolyte membrane and having a cathode catalyst layer;

a fuel electrode side casing which is provided so as to cover the rear surface side of the fuel electrode, a fuel tank for storing a liquid fuel being formed between the fuel electrode side casing and the rear surface of the fuel electrode; and an air electrode side casing which is provided so as to cover the rear surface side of the air electrode, an air chamber for storing air being formed between the air electrode side casing and the rear surface of the air electrode, wherein a plurality of inlet ports for introducing air into the air chamber are provided in the air electrode side casing, and fins for promoting heat dissipation are formed on an outer surface of the air electrode side casing.

According to the fuel cell of the present invention, heat generated by the bonding of hydrogen and oxygen at the air electrode is transmitted from the air electrode through the air or the filling material in the air chamber to the casing of the air electrode side, and then radiated from the surfaces of the fins to the surrounding air. By providing the fins on the outer surface of the air electrode side casing as described above, it is possible to increase the surface area of the air electrode side casing in contact with the surrounding air, increase the amount of heat to be discharged from the fuel cell, and suppress the temperature rise of the fuel cell.

For example, the fins described above are constituted of rib-like (streaky) projections arranged parallel to each other.

In that case, the plural inlet ports are desirably formed at each part interposed between two adjacent projections. By providing the inlet ports at the dips between the fins as described above, it is possible to arrange a number of fins and exhaust ports in the air electrode side casing. As a result, further, the air exhausted from the air chamber can be exhausted to the outside of the fuel cell after the temperature of the air is sufficiently lowered. Alternatively, it is possible to form the plural inlet ports so as to penetrate each of the projections.

It is desirable that an inner wall surface of the inlet port is inclined or stepped in such a manner that the cross-sectional area of the inlet port is changed toward the outside of the air electrode side casing. As a result, it is possible to further increase the surface area of the air electrode side casing in contact with the surrounding air.

It is possible to constitute the fins by a plurality pin-like projections arranged two-dimensionally as a modification example of the form of the fins. In this case, each of the inlet ports is formed at the dip surrounded by two to four projections. Alternatively, each of the inlet ports can be formed so as to penetrate each fin at a center of each fin.

Furthermore, by connecting an outer surface part of the fuel electrode side casing and an outer surface part of the air electrode side casing to each other by means of a film having high thermal conductivity, it is possible to transfer heat discharged from the fuel cell main body to the air electrode side so as to collect the heat. As a result, an abnormal temperature rise of the anode side can be suppressed, the crossover is reduced, and the fuel cell output can be improved.

According to the fuel cell of the present invention, the capability of discharging heat from the air chamber is enhanced, whereby the temperature rise of the fuel cell is suppressed and, consequently, improvement in the output characteristics of the fuel cell and prolongation of the service life of the fuel cell are realized. Moreover, according to the fuel cell of the present invention, the temperature rise of the casing of the fuel cell and the exhausted air is suppressed, and it becomes therefore possible to apply the fuel cell to a mobile apparatus.

BEST MODE FOR CARRYING OUT THE INVENTION

Figure 1:
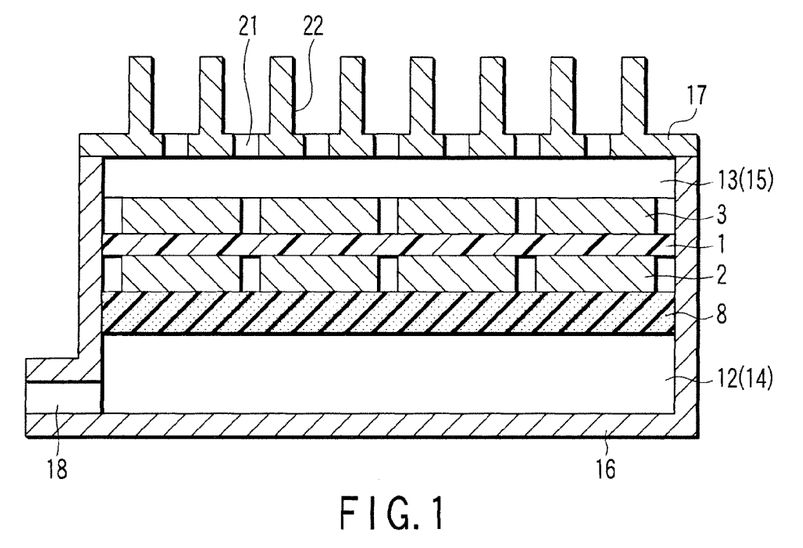
FIG. 1 is a cross-sectional view showing an example of a schematic configuration of a fuel cell according to the present invention.

FIG. 1 shows an example (cross-sectional view) of a schematic configuration of a fuel cell according to the present invention. In FIG. 1, reference numeral 1 denotes a solid electrolyte membrane, 2 denotes a fuel electrode, 3 denotes an air electrode, 12 denotes a fuel tank, 13 denotes an air chamber, 16 denotes a casing of the fuel tank side, 17 denotes a casing of the air chamber side, 21 denotes an inlet port, and 22 denotes a fin.

A membrane electrode assembly (MEA) serving as a power generation section is constituted of a solid electrolyte membrane 1, and a fuel electrode 2 (anode) and an air electrode 3 (cathode) which are disposed on both sides of the solid electrolyte membrane 1. The fuel electrode 2 and the air electrode 3 are made of carbon paper coated with platinum/ruthenium alloy catalyst, and are joined to the solid electrolyte membrane 1 by thermo-compression bonding such that their surfaces coated with the catalyst are in contact with the membrane 1. In the manner described above, the solid electrolyte membrane 1, fuel electrode 2, and air electrode 3 are integrated with each other, thereby constituting an electrode-membrane structure.

A porous membrane 8 is attached to the back surface (surface opposite to the solid electrolyte membrane 1) of the fuel electrode 2. A fuel tank 12 is formed between the casing 16 of the fuel electrode 2 side and the porous membrane 8. A fuel injection hole 18 for supplying a liquid fuel (methanol) to the inside of the fuel tank 12 is provided in the side wall of the casing 16 of the fuel electrode 2 side. The fuel tank 12 is filled with liquid-retaining sheets 14, and the liquid fuel is stored in the fuel tank 12 in a state where the fuel is absorbed into the liquid-retaining sheets 14. The liquid fuel is passed through the porous membrane 8, dispersed and then reaches the surface of the fuel electrode 2.

An air chamber 13 is formed on the back surface (surface opposite to the solid electrolyte membrane 1) of the air electrode 3. In order to keep the air electrode 3 in a wet state at all times, the air chamber 13 is filled with moisture-retaining sheets 15. The casing 17 of the air electrode 3 side is provided with a number of inlet ports 21 so that air can be introduced into the air chamber. In addition to this, in the fuel cell according to the present invention, a number of plate-like fins 22 are formed on the outer surface of the casing 17 of the air electrode side for the purpose of suppressing the temperature rise of the air electrode 3 and the inside of the air chamber 13.

In the fuel cell having the structure described above, heat generated by the bonding of hydrogen and oxygen at the air electrode 3 is transmitted from the air electrode 3 through the air, moisture, and moisture-retaining sheets 15 in the air chamber 13 to the casing 17 of the air electrode side. At the same time, the heat is also transmitted from the casing 16 of the fuel electrode 2 side to the casing 17 of the air electrode side. The heat transmitted to the casing 17 of the air electrode side is then dissipated from the surfaces of the fins 22 to the surrounding air. By providing the fins as described above, it is possible to increase the surface area of the casing 17 of the air electrode side in contact with the surrounding air, and increase the amount of heat to be discharged from the fuel cell.

Figure 2:
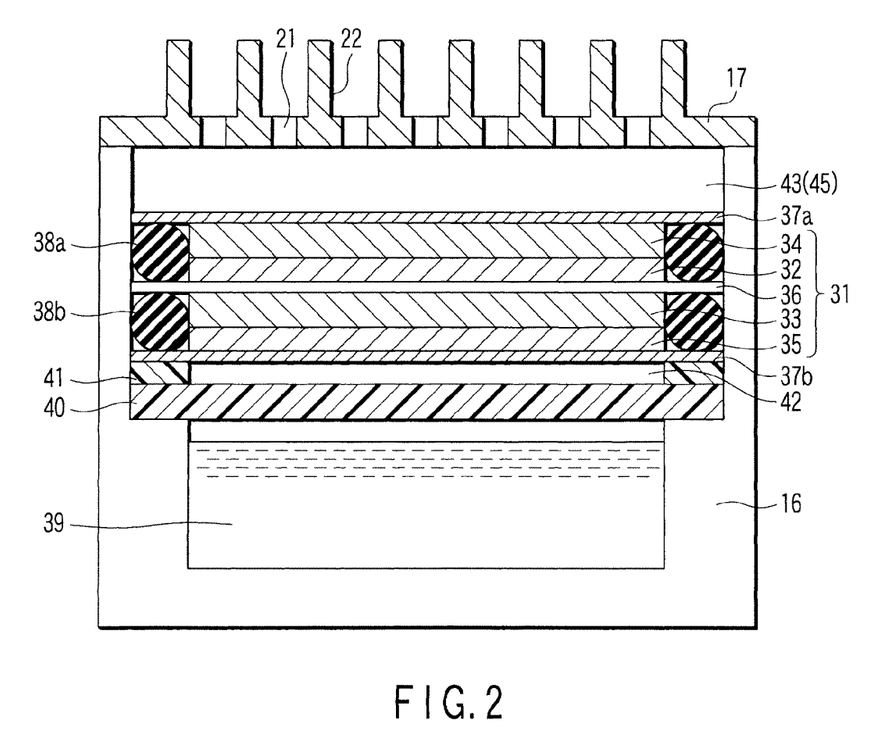
FIG. 2 is a cross-sectional view showing another example of the schematic configuration of the fuel cell according to the present invention.

FIG. 2 shows another example (cross-sectional view) of the schematic configuration of the fuel cell according to the present invention.

As shown in FIG. 2, a membrane electrode assembly (MEA) 31 is provided with an air electrode (cathode) constituted of a cathode catalyst layer 32 and a cathode gas diffusion layer 34, a fuel electrode (anode) constituted of an anode catalyst layer 33 and an anode gas diffusion layer 35, and an electrolyte membrane 36 having proton conductivity disposed between the cathode catalyst layer 32 and the anode catalyst layer 33.

Examples of the catalyst contained in the cathode catalyst layer 32 and anode catalyst layer 33 are, single metals of platinum group elements (Pt, Ru, Rh, Ir, Os, Pd, and the like) and alloys each containing a platinum group element. It is desirable that Pt—Ru having strong resistance to methanol and carbon monoxide be used as the anode catalyst, and Pt be used as the cathode catalyst. However, the present invention is not limited to the above. Further, a supported catalyst using a conductive support such as a carbon material or an unsupported catalyst may be used.

Examples of a proton-conducting material constituting the electrolyte membrane 36 having proton conductivity are a fluororesin (for example, perfluorosulfonic acid polymer) having a sulfonic group, a hydrocarbon resin (for example, polyether ketone having a sulfonic group, and sulfonated polyether ether ketone) having a sulfonic group, and inorganic matters such as tungstic acid and phoshotungstic acid. However, the present invention is not limited to the above.

The cathode catalyst layer 32 is placed on the cathode gas diffusion layer 34, and the anode catalyst layer 33 is placed on the anode gas diffusion layer 35. The cathode gas diffusion layer 34 has a role of uniformly supplying an oxidant to the cathode catalyst layer 32, and also serves as a current collector of the cathode catalyst layer 32. On the other hand, the anode gas diffusion layer 35 plays a role of uniformly supplying the fuel to the anode catalyst layer 33, and also doubles as a current collector of the anode catalyst layer 33. A cathode conduction layer 37a and an anode conduction layer 37b are in contact with the cathode gas diffusion layer 34 and the anode gas diffusion layer 35, respectively. As the cathode conduction layer 37a or the anode conduction layer 37a, a porous layer (for example, a mesh layer) made of a metallic material, for example, gold can be used.

A cathode seal member 38a having a rectangular frame-like shape is disposed between the cathode conduction layer 37a and the proton-conducting electrolyte membrane 36 and surrounds the cathode catalyst layer 32 and the cathode gas diffusion layer 34. On the other hand, an anode seal member 38b having a rectangular frame-like shape is disposed between the anode conduction layer 37b and the proton-conducting electrolyte membrane 36 and surrounds the anode catalyst layer 33 and anode gas diffusion layer 35. The cathode seal member 38a and the anode seal member 38b are O-rings for preventing the fuel and the oxidant from leaking from the membrane electrode assembly 31.

Below the membrane electrode assembly 31, a casing 16 of the fuel electrode side is arranged, and a fuel tank 39 is provided between the anode conduction layer 37b and the casing 16. Liquid methanol or an aqueous solution of methanol is accommodated in the fuel tank 39. A gas-liquid separating membrane 40 through which only a vaporized component of the liquid fuel is passed and the liquid fuel cannot be passed is arranged at the opening end of the fuel tank 39 so as to cover the opening of the fuel tank 39. In this case, the vaporized component of the liquid fuel implies vaporized methanol when liquid methanol is used as the liquid fuel, and implies a mixed gas of a vaporized component of methanol and a vaporized component of water when an aqueous solution of methanol is used as the liquid fuel.

A frame 41 made of a resin is disposed between the gas-liquid separating membrane 40 and the anode conduction layer 37b. The space surrounded by the frame 41 functions as a vaporized fuel accommodation chamber 42 (so-called steam pocket) for temporarily accommodating the vaporized fuel diffused through the gas-liquid separating membrane 40. By virtue of the permeation methanol amount suppressing effect of the vaporized fuel accommodation chamber 42 and the gas-liquid separating membrane 40, it is possible to prevent the vaporized fuel from being supplied to the anode catalyst layer 33 in an excessive amount at a time, and suppress the occurrence of methanol crossover. Incidentally, the frame 41 is a rectangular frame and is formed of a thermoplastic polyester resin such as PET.

On the other hand, on the upper side of the cathode conduction layer 37a disposed at the upper part of the membrane electrode assembly 31, an air chamber 43 is formed. In order to keep the air electrode (32, 34) in a wet state at all times, the air chamber 43 is filled with moisture-retaining sheets 45. The casing 17 of the air electrode side is provided with a number of inlet ports 21 so that air can be introduced into the air chamber. In addition to this, a number of plate-like fins 22 are formed on the outer surface of the casing 17 of the air electrode side for the purpose of suppressing the temperature rise of the air electrode (32, 34) and the inside of the air chamber 43.

The casing 17 of the air electrode side also plays a role of pressurizing the laminated structure including the membrane electrode assembly 31 so as to enhance the tightness of contact within the structure, and thus the casing 17 is made of a metallic material such as SUS 304. The moisture-retaining sheets 45 plays both a role of preventing water produced in the cathode catalyst layer 32 from transpiring, and a role of an auxiliary diffusion layer for promoting uniform diffusion of an oxidant into the cathode catalyst layer 32 by uniformly introducing the oxidant into the cathode gas diffusion layer 34.

It is desirable that the moisture-retaining sheets 45 be formed of an insulating material which is inactive and has no solubility with respect to methanol. Examples of such an insulating material are polyolefins such as polyethylene and polypropylene.

It is desirable that the moisture-retaining sheets 45 should have air permeability stipulated in JIS P-9117-1998 equal to or less than 50 sec/100 cm$^3$. This is because, if the air permeability exceeds 50 sec/100 cm$^3$, there is the possibility of air being hindered from diffusing from the inlet ports 21 to the cathode, thereby making it impossible to obtain a high output. A more desirable range of the air permeability is 10 sec/100 cm$^3$ or less.

It is desirable that the moisture-retaining sheets 45 should have water vapor permeability stipulated in JIS L-1099-1993 method A-1 equal to or less than 6000 g/m$^2$ 24 h. Incidentally, the value of the water vapor permeability described above is, as shown in the measurement method of JIS L-1099-1993 method A-1, a value at a temperature of 40±2° C. This is because, if the water vapor permeability exceeds 6000 g/m$^2$ 24 h, the amount of vaporized water from the cathode becomes large, and there is the possibility of the effect of promoting diffusion of water from the cathode to the anode being not obtained sufficiently. Further, if the water vapor permeability is less than 500 g/m$^2$ 24 h, there is the possibility of an excessive amount of water being supplied to the anode, thereby making it impossible to obtain a high output. Accordingly, it is desirable that the water vapor permeability be within the range of 500 to 6000 g/m² 24 h. A more desirable range of the water vapor permeability is 1000 to 4000 g/m² 24 h.

According to the direct-methanol-type fuel cell associated with the first embodiment having the configuration described above, the liquid fuel (for example, an aqueous solution of methanol) is vaporized, the vaporized methanol and water diffuse through the gas-liquid separating membrane 40, then temporarily accommodated in the vaporized fuel accommodation chamber 42, thereafter gradually diffuse through the anode gas diffusion layer 35 so as to be supplied to the anode catalyst layer 33, and an internal reforming reaction of methanol shown by the following reaction formula (1) is caused.

$$CH_3OH+H_2O \rightarrow CO_2+6H^++6e^- \quad (1)$$

Further, when pure methanol is used as the liquid fuel, water is not supplied from the fuel vaporization layer, and hence water produced by the oxidation reaction of methanol mixed in the cathode catalyst layer 32 and moisture in the proton-conducting electrolyte membrane 36 or the like reacts with methanol to produce the internal reforming reaction of the formula (1) described above or the internal reforming reaction is caused by a reaction mechanism using no water independent of the formula (1).

The proton ($H^+$) produced by the internal reforming reaction diffuses through the proton-conducting electrolyte membrane 36 and reaches the cathode catalyst layer 33. On the other hand, air taken in through the inlet ports 21 of the casing 17 diffuses through the moisture-retaining sheets 45 and the cathode gas diffusion layer 34 so as to be supplied to the cathode catalyst layer 32. In the cathode catalyst layer 32, water is produced by the reaction shown by the following formula (2), that is, a power generation reaction is caused.

$$(3/2)O_2+6H^++6e^- \rightarrow 3H_2O \quad (2)$$

When the power generation reaction proceeds, water produced in the cathode catalyst layer 32 by the reaction or the like shown by the formula (2) described above, diffuses through the cathode gas diffusion layer 34 and reaches the moisture-retaining sheets 45, and is then hindered from being transpired by the moisture-retaining sheets 45, thereby increasing the moisture storage amount in the cathode catalyst layer 32. In consequence of this, with the progress of the power generation reaction, it is possible to produce a state where the retained moisture amount of the cathode catalyst layer 32 is larger than that of the anode catalyst layer 33. As a result, a reaction in which the water produced in the cathode catalyst layer 32 passes through the proton-conducting electrolyte membrane 36 to move to the anode catalyst layer 33 is promoted by an osmotic pressure phenomenon. Accordingly, it is possible to further improve the rate of water supply to the anode catalyst layer as compared with the case where the rate of water supply to the anode catalyst layer depends only on the fuel vaporization layer, and promote the internal reforming reaction of methanol shown by the formula (1) described above. As a result, it becomes possible to increase the output density and maintain the high output density for a long period of time.

Figure 3A:
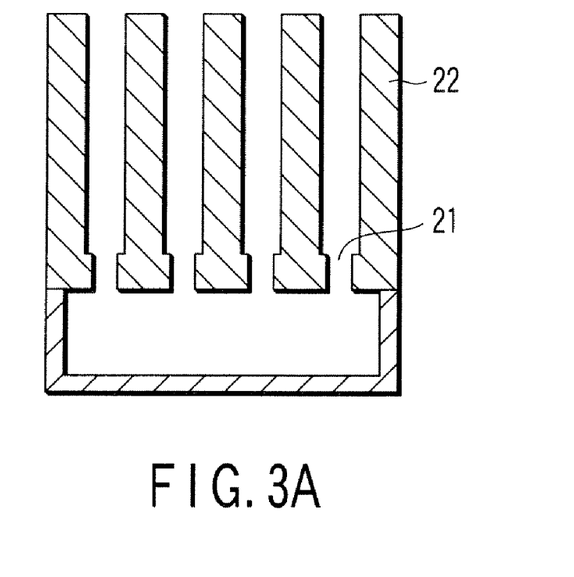
FIG. 3A is a cross-sectional view showing an example of shapes and arrangements of a fin and an inlet port in the fuel cell according to the present invention.
Figure 3B:
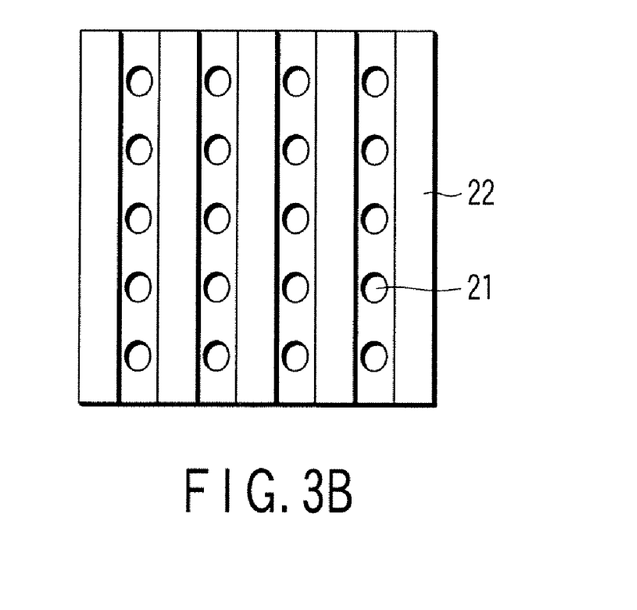
FIG. 3B is a top view of the fuel cell shown in FIG. 3A.

FIGS. 3A and 3B show an example of shapes and arrangements of a fin and an inlet port in the fuel cell according to the present invention. FIG. 3A is a cross-sectional view, and FIG. 3B is a top view. Incidentally, as for the internal structure of the fuel cell, it is the same as that previously shown in FIG. 1 or 2, and thus the internal structure is omitted from this cross-sectional view.

In this example, fins 22 are constituted of a plurality of ribs each having a rectangular cross section and arranged parallel to each other. Inlet ports 21 are formed at each part interposed between two adjacent projections in such a manner that a plurality of inlet ports 21 are aligned.

Figure 4A:
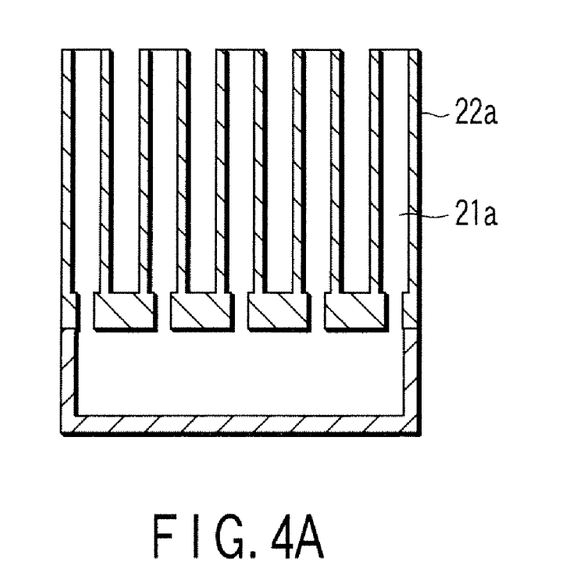
FIG. 4A is a cross-sectional view showing another example of shapes and arrangements of a fin and an inlet port in the fuel cell according to the present invention.
Figure 4B:
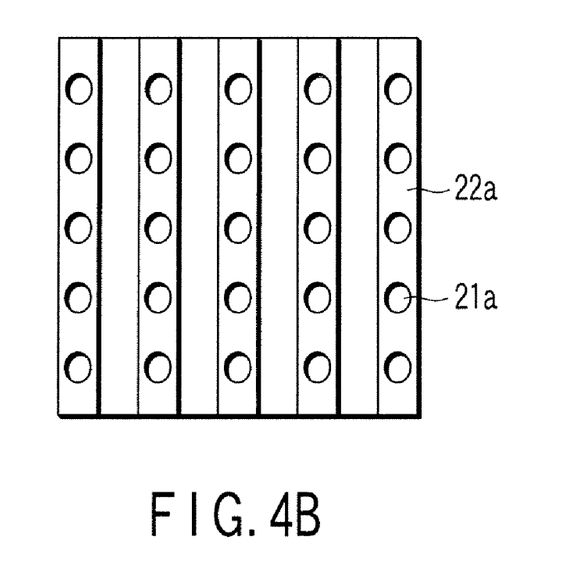
FIG. 4B is a top view of the fuel cell shown in FIG. 4A.

FIGS. 4A and 4B show another example of shapes and arrangements of a fin and an inlet port in the fuel cell according to the present invention. FIG. 4A is a cross-sectional view, and FIG. 4B is a top view. Incidentally, as for the internal structure of the fuel cell, it is the same as that previously shown in FIG. 1 or 2, and thus the internal structure is omitted from this cross-sectional view.

In this example, like in the foregoing example, fins 22 are constituted of a plurality of ribs each having a rectangular cross section and arranged parallel to each other. On the other hand, inlet ports 21a are formed in the projections 22a in such a manner that a plurality of inlet ports 21a are aligned to penetrate each projection 22a.

Figure 5A:
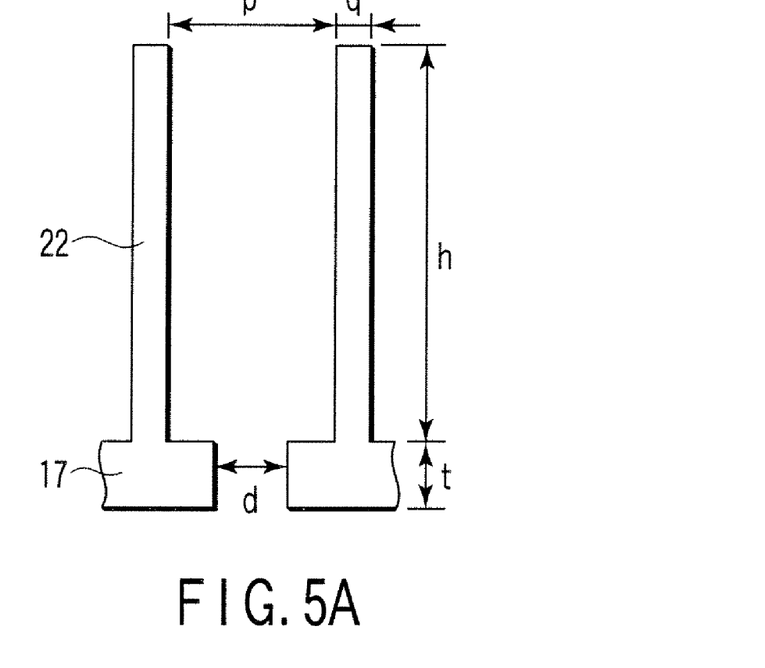
FIG. 5A is a partial cross-sectional view showing another example of shapes and arrangements of a fin and an inlet port in the fuel cell according to the present invention.
Figure 5B:
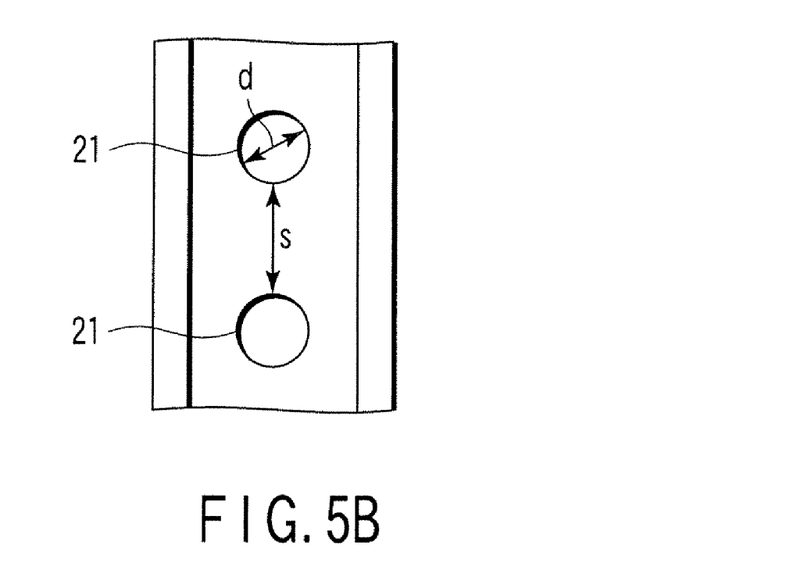
FIG. 5B is a partial top view of the fuel cell shown in FIG. 5A.

FIGS. 5A and 5B show still another example of shapes and arrangements of a fin and an inlet port. FIG. 5A is a cross-sectional view (partial), and FIG. 5B is a top view (partial). In this example, a wall thickness 't' of a casing 17 is about 1 to 5 mm. On the other hand, an interval 'p' between fins 22 is about 5 to 10 mm, and a thickness 'g' of the fin is about 0.3 to 1 mm, a height 'h' of the fin is about 5 to 10 mm, a diameter 'd' of an inlet port 21 is about 3 to 8 mm, and an interval 's' between inlet ports is about 5 to 15 mm.

Figure 6A:
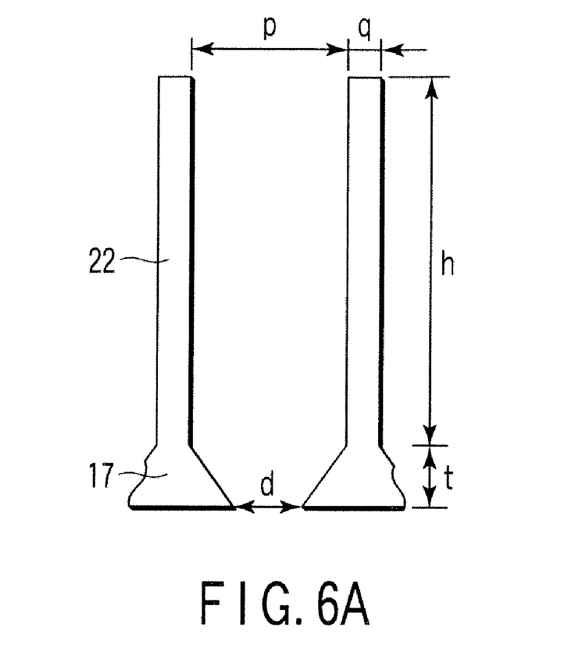
FIG. 6A is a partial cross-sectional view showing another example of shapes and arrangements of a fin and an inlet port in the fuel cell according to the present invention.
Figure 6B:
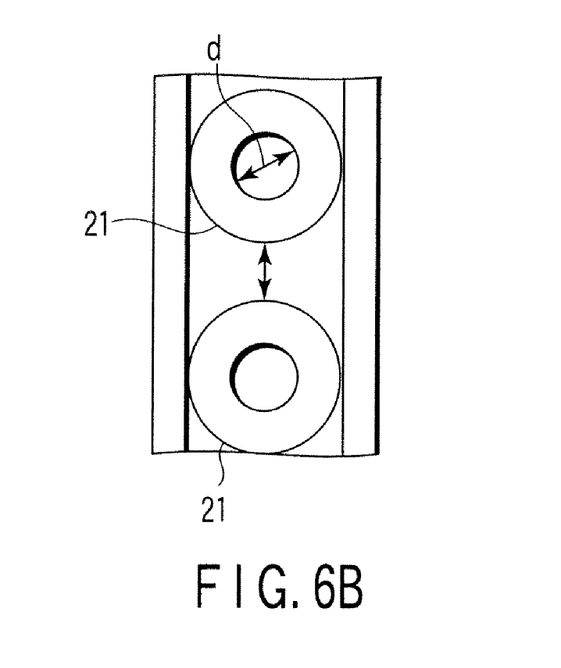
FIG. 6B is a partial top view of the fuel cell shown in FIG. 6A.

FIGS. 6A and 6B show still another example of shapes and arrangements of a fin and an inlet port. FIG. 6A is a cross-sectional view (partial), and FIG. 6B is a top view (partial). In this example, an inner peripheral surface of an inlet port is partially inclined in such a manner that the diameter of the inlet port 21 is gradually increased toward the outside. The entrance of the inlet port 21 is in outside contact with the base part of the fins 21 on the outer surface of the casing 17.

Figure 7:
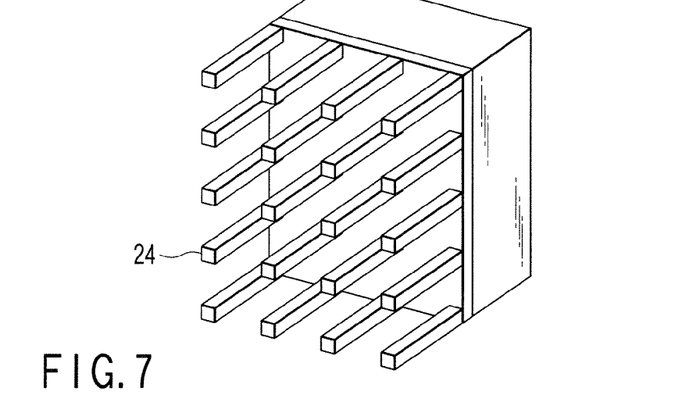
FIG. 7 is an oblique view showing another example of a form of a fin of the fuel cell according to the present invention.

FIG. 7 shows an oblique view of another example of the shape of a fin. In this example, a number of pin-type fins 24 are formed on an outer surface of a casing 17 of the air electrode side. By employing the pin-type fins, although the manufacturing cost is increased, the heat dissipation performance of the fins is hardly affected by the posture of the fins, and hence the degree of freedom of design is enhanced.

Figure 8A:
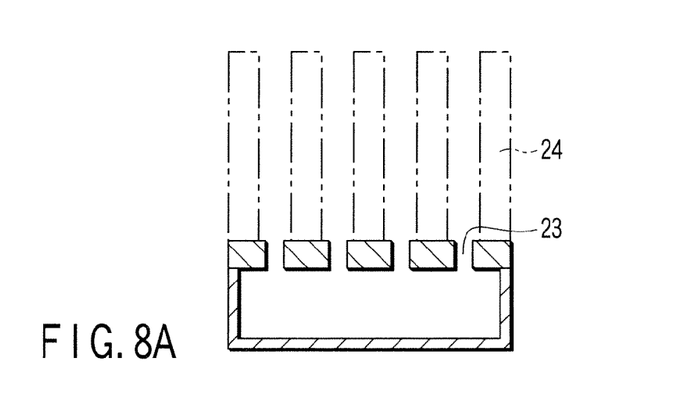
FIG. 8A is a cross-sectional view showing another example of shapes and arrangements of a fin and an inlet port in the fuel cell according to the present invention.
Figure 8B:
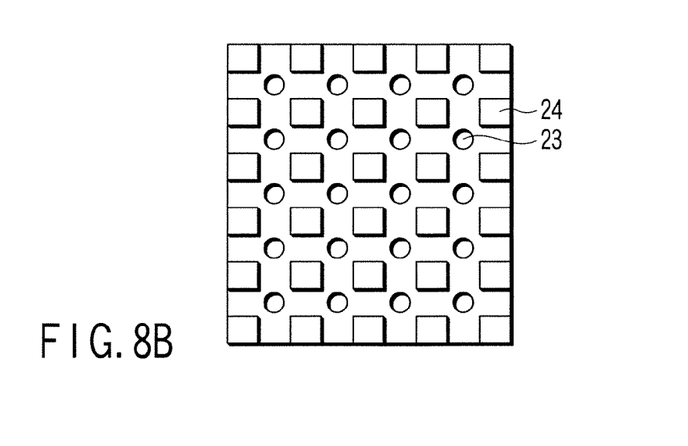
FIG. 8B is a top view of the fuel cell shown in FIG. 8A.
Figure 9A:
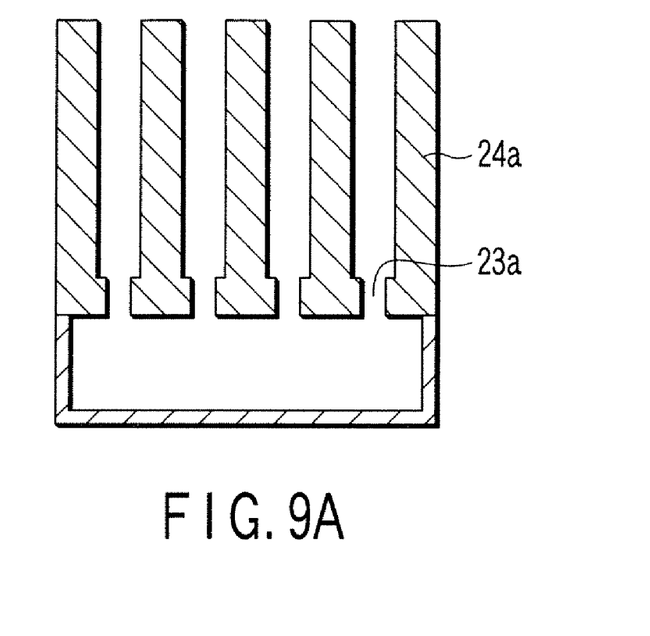
FIG. 9A is a cross-sectional view showing another example of shapes and arrangements of a fin and an inlet port in the fuel cell according to the present invention.
Figure 9B:
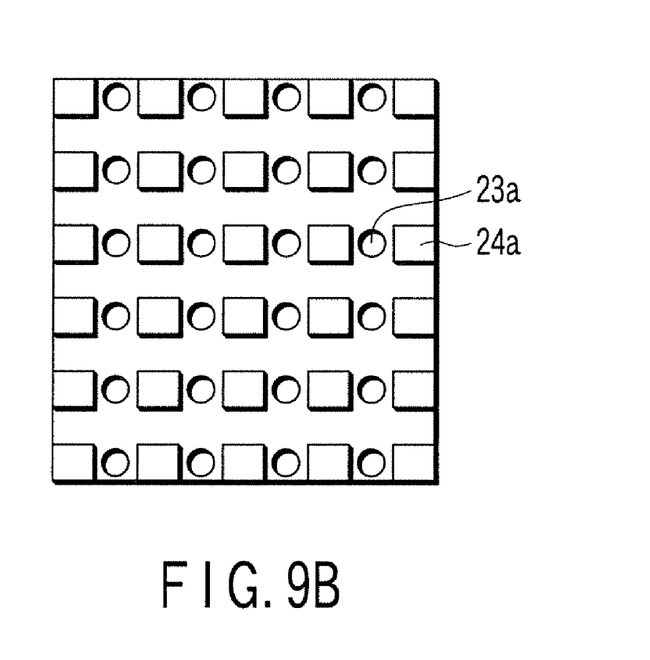
FIG. 9B is a top view of the fuel cell shown in FIG. 9A.
Figure 10A:
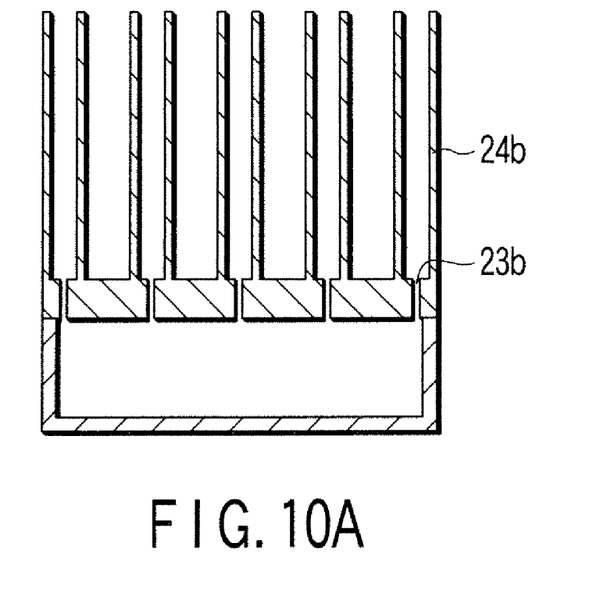
FIG. 10A is a cross-sectional view showing another example of shapes and arrangements of a fin and an inlet port in the fuel cell according to the present invention.
Figure 10B:
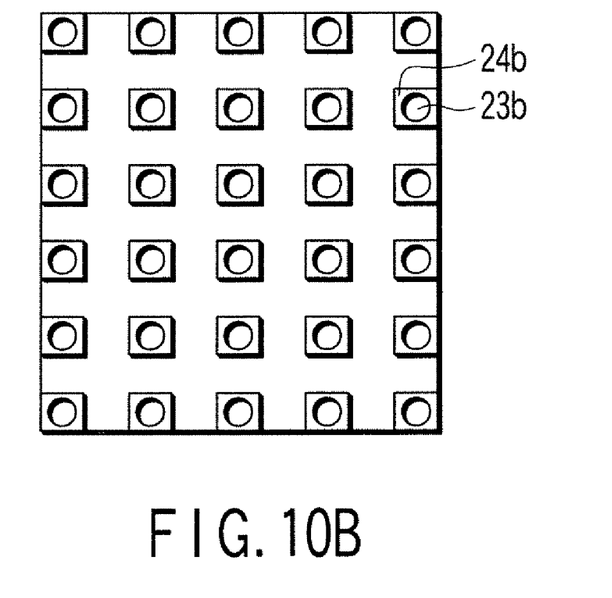
FIG. 10B is a top view of the fuel cell shown in FIG. 10A.

FIGS. 8A and 8B show an example of an arrangement of an inlet port in a case where the pin-type fins are employed. FIG. 8A is a cross-sectional view, and FIG. 8B is a top view. In this example, each inlet port 23 is formed in the center of a region surrounded by four fins 24. FIGS. 9A and 9B show another example of an arrangement of an inlet port. FIG. 9A is a cross-sectional view, and FIG. 9B is a top view. In this example, each inlet port 23a is formed between two fins 24a. FIGS. 10A and 10B show still another example of an arrangement of an inlet port. FIG. 10A is a cross-sectional view, and FIG. 10B is a top view. In this example, each inlet port 23b is formed so as to allow it to penetrate each fin 24b at a center of each fin 24b.

Incidentally, as for the cross-sectional shape of the pin-type fin, a circular, square, oblong, plate-like, hexagonal, and an anomaly shape such as a star shape can be employed in addition to the rectangular shape shown in the above examples.

In the fuel cell of the present invention, any material may be used as the material for the fin as long as it has large thermal conductivity, and the material is not limited to a specific material. For example, an extrusion material, die casting material, or processed material made of a plate material, such as aluminum (Al) can be used. Each of these materials is desirably used in a state where the surface thereof is anodized. In order to enhance emissivity, it is particularly desirable that the surface of the material be anodized black. Besides, a metal such as copper (Cu), tungsten (W), and molybdenum (Mo), and a ceramic such as aluminum nitride (AlN) may also be used.

Next, results of evaluation tests of fuel cells using fins respectively having shapes shown in FIGS. 5A and 5B, and FIGS. 6A and 6B will be described below.

As a first example, a fuel cell using fins having a shape and arrangement shown in FIGS. 5A and 5B was manufactured. In this example, the wall thickness 't' of the casing was 2 mm, the interval 'p' between fins was 7 mm, the thickness 'q' of the fin was 0.5 mm, the height 'h' of the fin was 10 mm, the diameter 'd' of the inlet port was 5 mm, and the interval 's' between inlet ports was 5 mm.

As a second example, a fuel cell using fins having a shape and arrangement shown in FIGS. 6A and 6B was manufactured. In this example, the wall thickness 't' of the casing was 2 mm, the interval 'p' between fins was 7 mm, the thickness 'q' of the fin was 0.5 mm, the height 'h' of the fin was 10 mm, the diameter 'd' of the inlet port was 5 mm, and the interval 's' between inlet ports was 5 mm. An inner peripheral surface of the inlet port had an inclination from the bottom toward the fins in such a manner that the diameter of the inlet port was gradually increased toward the outside.

A heat dissipation amount was measured with respect to each of the fuel cells using fins respectively having the shapes shown in FIGS. 5A and 5B, and FIGS. 6A and 6B, and a conventional fuel cell having no fins, under the following conditions: the surface temperature of the fuel cells kept at 60° C., and the ambient temperature set at 20° C. As a result, when the heat dissipation amount (relative value) of the conventional fuel cell having no fins was assumed to be 1.0, the heat dissipation amount of the fuel cell using the fins shown in FIGS. 5A and 5B was 1.2, and that of the fuel cell using the fins shown in FIGS. 6A and 6B was 1.1. As described above, it is confirmed that the fuel cells of the present invention are superior to the conventional fuel cell in the heat dissipation performance. The fuel cells of the present invention are excellent in the heat dissipation performance, and thus the heat discharge amount from the air chamber is large, the temperature rise of the fuel cell is therefore suppressed. As a result, improvement in the output characteristics of the fuel cell and prolongation of the service life of the fuel cell are realized.

Incidentally, in the above description, the case where the fuel component to be supplied to the anode catalyst layer is a vaporized gas has been explained. However, the fuel component is not limited to the gas, but may be a liquid. Various types of fuel may be used according to the configuration of the fuel cell which is the object. Further, as for the liquid fuel in the fuel tank, the liquid fuel is not necessarily limited to the methanol fuel. For example, an ethanol fuel such as an aqueous solution of ethanol and pure ethanol, a propanol fuel such as an aqueous solution of propanol or pure propanol, a glycol fuel such as an aqueous solution of glycol and pure glycol, dimethyl ether, formic acid, or other liquid fuel may be used. In any case, fuels of various concentrations and types may be used in accordance with the fuel cell.

The invention claimed is:

1. A fuel cell comprising:
a solid electrolyte membrane having ion conductivity;
a fuel electrode disposed on one side of the solid electrolyte membrane and having an anode catalyst layer to which a fuel component of a liquid fuel is supplied;
an air electrode disposed on the other side of the solid electrolyte membrane and having a cathode catalyst layer;
a fuel electrode side casing which is provided so as to cover the rear surface side of the fuel electrode, a fuel tank for storing a liquid fuel being formed between the fuel electrode side casing and the rear surface of the fuel electrode; and
an air electrode side casing which is provided so as to cover the rear surface side of the air electrode, an air chamber for storing air being formed between the air electrode side casing and the rear surface of the air electrode, wherein
a plurality of inlet ports for introducing air into the air chamber are provided in the air electrode side casing, and
fins for promoting heat dissipation are formed on an outer surface of the air electrode side casing, wherein the fins are constituted of a plurality of rib-like projections arranged parallel to each other, and the plurality of inlet ports are formed so as to penetrate each of the projections.

2. The fuel cell according to claim 1, wherein a fuel component to be supplied to the anode catalyst layer is a liquid or a gas.

3. A fuel cell comprising:
a solid electrolyte membrane having ion conductivity;
a fuel electrode disposed on one side of the solid electrolyte membrane and having an anode catalyst layer to which a fuel component of a liquid fuel is supplied;
an air electrode disposed on the other side of the solid electrolyte membrane and having a cathode catalyst layer;
a fuel electrode side casing which is provided so as to cover the rear surface side of the fuel electrode, a fuel tank for storing a liquid fuel being formed between the fuel electrode side casing and the rear surface of the fuel electrode; and
an air electrode side casing which is provided so as to cover the rear surface side of the air electrode, an air chamber for storing air being formed between the air electrode side casing and the rear surface of the air electrode;
wherein a plurality of inlet ports for introducing air into the air chamber are provided in the air electrode side casing, wherein an inner wall surface of the inlet port is inclined or stepped in such a manner that the cross-sectional area of the inlet port is changed toward the outside of the air electrode side casing, and
fins for promoting heat dissipation formed on an outer surface of the air electrode side casing, wherein the fins are constituted of a plurality of rib-like projections arranged parallel to each other, and the plurality of inlet ports are formed at each part interposed between two adjacent rib-like projections.

4. The fuel cell according to claim 3, wherein a fuel component to be supplied to the anode catalyst layer is a liquid or a gas.

5. A fuel cell comprising:
a solid electrolyte membrane having ion conductivity;
a fuel electrode disposed on one side of the solid electrolyte membrane and having an anode catalyst layer to which a fuel component of a liquid fuel is supplied;
an air electrode disposed on the other side of the solid electrolyte membrane and having a cathode catalyst layer;
a fuel electrode side casing which is provided so as to cover the rear surface side of the fuel electrode, a fuel tank for storing a liquid fuel being formed between the fuel electrode side casing and the rear surface of the fuel electrode; and
an air electrode side casing which is provided so as to cover the rear surface side of the air electrode, an air chamber for storing air being formed between the air electrode side casing and the rear surface of the air electrode, wherein a plurality of inlet ports for introducing air into the air chamber are provided in the air electrode side casing, and fins for promoting heat dissipation are formed on an outer surface of the air electrode side casing, wherein the fins are constituted of a plurality pin-like projections arranged two-dimensionally, and each of the inlet ports is formed between adjacent projections.

6. The fuel cell according to claim 5, wherein a fuel component to be supplied to the anode catalyst layer is a liquid or a gas.

7. A fuel cell comprising:

a solid electrolyte membrane having ion conductivity;

a fuel electrode disposed on one side of the solid electrolyte membrane and having an anode catalyst layer to which a fuel component of a liquid fuel is supplied;

an air electrode disposed on the other side of the solid electrolyte membrane and having a cathode catalyst layer;

a fuel electrode side casing which is provided so as to cover the rear surface side of the fuel electrode, a fuel tank for storing a liquid fuel being formed between the fuel electrode side casing and the rear surface of the fuel electrode; and an air electrode side casing which is provided so as to cover the rear surface side of the air electrode, an air chamber for storing air being formed between the air electrode side casing and the rear surface of the air electrode, wherein a plurality of inlet ports for introducing air into the air chamber are provided in the air electrode side casing, and fins for promoting heat dissipation are formed on an outer surface of the air electrode side casing, wherein the fins are constituted of a plurality pin-like projections arranged two-dimensionally, and each of the inlet ports is formed so as to penetrate each fin at a center of each fin.

8. The fuel cell according to claim 7, wherein a fuel component to be supplied to the anode catalyst layer is a liquid or a gas.

* * * * *